July 17, 1962 C. B. HEFFRON ET AL 3,045,062

AUTOMATIC FREQUENCY CONTROL

Filed June 14, 1960 2 Sheets-Sheet 1

INVENTORS
Charles B. Heffron &
Olaf H. Fernald
BY
Benjamin DeWitt
ATTORNEY

July 17, 1962 C. B. HEFFRON ET AL 3,045,062

AUTOMATIC FREQUENCY CONTROL

Filed June 14, 1960

2 Sheets-Sheet 2

3,045,062

AUTOMATIC FREQUENCY CONTROL

Charles B. Heffron, Metuchen, N.J., and Olaf H. Fernald, Needham Heights, Mass., assignors to Westinghouse Electric Corporation, East Pittsburgh, Pa., a corporation of Pennsylvania Filed June 14, 1960, Ser. No. 35,918
7 Claims. (Cl. 178—69.5)

The present invention relates to automatic frequency control of periodic wave generators and more particularly to an improved control circuit for use in television receivers for synchronizing the deflection of the cathode ray beam with the synchronization components of the incoming television signals.

In television receivers the beam of a cathode ray tube is scanned both vertically and horizontally to traverse the image display screen in a time sequence which must be correlated with the received picture information. To assure that a particular discrete portion of the video information is directed to the correct portion of the display screen, both the horizontal and vertical scanning of the picture screen must be synchronized with the synchronization components of the television signal. Direct control methods utilizing received synchronization pulses to directly trigger a scanning wave generator are undesirable because noise pulses which cannot be conveniently distinguished from the synchronization pulses may spuriously trigger the scanning wave generator resulting in spurious phasing of the scanning wave and distortion of the television picture. To overcome the foregoing difficulty, most present day television receivers utilize a free-running oscillator to generate the scanning wave. An automatic frequency control circuit is provided for governing the frequency and phase of the scanning wave oscillator. Such control circuits normally comprise a phase detector which is responsive to the line synchronization components of the television signal and to the output wave of the scanning wave generator to provide a control voltage dependent upon the phase relationship between those two signals. The variable output voltage of the phase detector is used to control the frequency of the scanning wave oscillator or multivibrator to thereby synchronize the oscillator with the received signal. Such automatic frequency control circuits are preferred in present day television receivers because they are relatively immune to noise disturbance and temporary loss of the received synchronizing components.

One common phase detector circuit comprises a pair of diodes connected in balanced relation in a bridge configuration. The input signals to the dual diode phase detector normally are (1) synchronization pulses from the sync separator of the television receiver, and (2) retrace pulses derived from the flyback transformer of the scanning wave generator or from differentiation of the sawtooth voltage waveform horizontal scanning signal. In conventional television receivers the output voltage of the dual diode phase detector is filtered to remove alternating current components and is used to vary the bias on a control grid of a discharge device which comprises a portion of the scanning wave generator circuit. Conventional dual diode phase detectors as described above are passive circuits which provide no voltage or current gain but merely compare the relative phases of the two signals applied thereto. Such phase detectors are reasonably adequate when used to control the bias voltage applied to a tube type multivibrator because control of such multivibrators requires only a bias potential applied to a high impedance input circuit.

One of the concepts on which the present invention is based is the perception that when a transistor multivibrator or other transistor oscillator is used as the scanning wave generator in a television receiver, conventional dual diode phase detector circuits are inadequate to provide the control signal power needed. The provision of transistor circuits in television receivers in place of the conventional vacuum tube circuits is highly desirable in that transistor circuits are inherently more compact, more efficient, more rugged and longer lived. In order to use conventional dual diode phase detector circuits, with a transistor scanning wave generator, one or more amplification stages would be required as D.C. amplifiers in cascade between the phase detector output and the low impedance input circuit of the scanning wave generator. Provision of such additional amplification stages in commercial television receivers is practically prohibited by the nortorious thermal instability of most transistor circuits and by economy considerations. The present invention overcomes the foregoing difficulty by providing a frequency control circuit having substantial gain, utilizing a single semiconductor device and having a low impedance output circuit capable of directly controlling the frequency of a low impedance multivibrator or other low input impedance scanning wave generator circuit.

Another disadvantage of conventional dual diode phase detector circuits is the fact that they not only respond to the phase relationship between the synchronizing pulses and the retraced pulses but they also are responsive to variations in the amplitude of the synchronization pulses. In conventional television receivers the amplitude of the synchronizing pulses are derived from the sync separator will vary with changes in the line voltage and with changes in received signal strength. In addition most practical sync separators cause a certain amount of amplitude modulation of the synchronizing pulses. Conventional dual diode phase detectors will respond to such modulations of the synchronizing signal amplitude and will spuriously shift the phase of the horizontal multivibrator.

Accordingly it is a primary object of the present invention to provide an automatic frequency control circuit for comparing the phase of two pulsating signals and for producing an output signal dependent upon the phase relationship and substantially independent of the amplitude of the input signals.

It is a further object of the present invention to provide an automatic frequency control circuit for comparing the phase difference of two pulsating signals and for producing a direct current signal corresponding to the phase relationship and of sufficient power to provide frequency control of a low input impedance oscillatory circuit.

It is another object of the present invention to provide an improved automatic frequency control system utilizing semiconductor devices for the horizontal deflection system of a television receiver.

It is a different object of the present invention to provide automatic frequency control of a deflection wave generator in which retrace pulse energy from the generator output is utilized to provide power amplification of the frequency control signal.

It is a general object of the present invention to provide an improved and simplified automatic frequency control circuit for controlling a scanning wave generator so that the frequency thereof varies as a function of the phase relationship between its output signal and the received synchronization pulses, and substantially independently of variations in the peak amplitude of the synchronization pulses.

It is another general object of the present invention to provide an improved automatic frequency control circuit requiring a minimum of component parts and circuitry, and exhibiting a high degree of noise immunity.

A primary feature of the present invention is provision of an automatic frequency control circuit utilizing a hyperconductive negative resistance semiconductor device to provide a low impedance output signal which varies as a function of the relative phase of a pair of input signals and is substantially independent of input signal amplitudes, thereby enabling noise immune frequency and phase control which is unaffected by variations in the amplitude of the input synchronizing signal.

Another feature of the invention is provision of an automatic frequency control circuit which utilizes a single semiconductor device connected in a novel circuit arrangement having a low output impedance and enabling direct and efficient control of a scanning wave generator having an input impedance of the order of 3000 ohms or less.

The foregoing and other objects and features of the present invention will be apparent from the following description, taken with the accompanying drawing, throughout which drawing like reference characters indicate like parts, which drawing forms a part of this application, and in which.

Figures 1, 2:
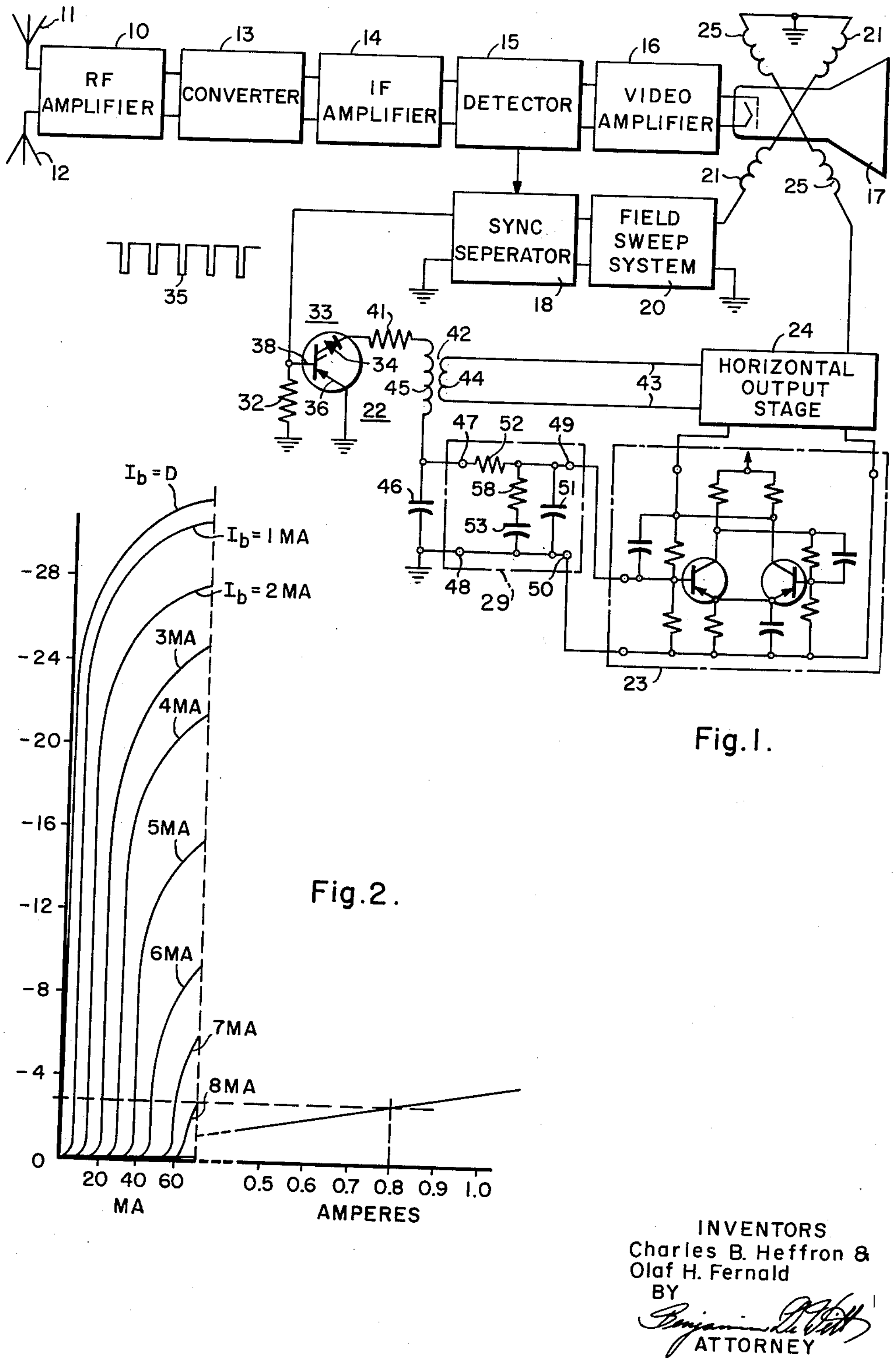
FIGURE 1 is a schematic diagram of a television receiver, partially in block diagram form, incorporating the frequency control system of the present invention.
FIG. 2 is a plurality of curves used in explaining the operation of the invention.

Referring to FIG. 1, there is illustrated a television receiver incorporating the frequency control system of the invention, with the conventional components of the receiver shown in block diagram form. The receiver includes a radio frequency amplifier 10 of any desired number of stages having input terminals connected to a conventional antenna 11, 12; and having output terminals connected to a first detector or converter stage 13. Converter 13 is coupled to an intermediate frequency amplifier stage 14 which is coupled to a second detector and video demodulator stage 15. The output circuit of detector 15 is coupled, through a video amplifier 16 which may be of conventional form, to the grid and cathode input electrodes of a conventional cathode ray image reproducing device 17. Image device 17 is provided with the usual deflection yoke comprising horizontal deflection windings 25 and vertical deflection windings 21.

The output circuit of detector 15 is also connected to the input circuit of a sync separator 18, having first and second output circuits. The first output circuit is coupled through a field sweep system 20 to the vertical deflection coils 21 of the deflection yoke. The second output circuit of sync separator 18 is coupled to a control circuit 22 constructed in accordance with the present invention. Control circuit 22 will be described in further detail hereinafter. The output of control circuit 22, in the form of periodic current pulses, is coupled through a low pass filter network 29 to a transistorized scanning wave generator 23. Scanning wave generator 23 is connected to the input circuit of a horizontal deflection output stage 24 which in turn is coupled to the horizontal deflection coils 25 of the deflection yoke. The circuitry for processing and reproducing the sound signal which accompanies the received television video signal forms no part of the present invention, and accordingly such circuitry is not shown.

The television receiver of FIG. 1 may be tuned to a television signal intercepted by antenna 11, 12, and such television signal is amplified in amplifier 10 and heterodyned to the desired intermediate frequency in the converter 13. The intermediate frequency video carrier signal is amplified by IF amplifier 14 and is demodulated by detector 15 to produce a composite video signal comprising video image components and horizontal and vertical synchronizing components. The composite video signal is applied through amplifier 16 to the input electrodes of image reproducing device 17 to control the intensity of the cathode ray in accordance with the video signal image intelligence.

The horizontal and vertical synchronizing components of the video signal are separated from each other and from the video signal intelligence by sync separator 18. The vertical deflection component is supplied to vertical sweep system 20 to synchronize the same. The horizontal synchronization components, as derived from the second output circuit of sync separator 18, normally comprise a train of short duration pulses as shown at 35, which recur, in accordance with accepted standards, at a 15,750 cycle per second rate. The horizontal sync pulses are utilized by control circuit 22 in a manner to be described, to control the frequency and phase of oscillator 23 and, thereby to control the frequency and phase of the horizontal deflection wave produced by horizontal output stage 24. The sawtooth current wave form produced by stage 24 is applied to the horizontal deflection coils 25 to deflect the cathode ray beam of tube 17 in a manner to intelligibly reproduce the received television signal on the viewing screen.

In accordance with the present invention the phase detector or phase comparator circuit 22 comprises a hyperconductive negative resistance semiconductor device 33 which may be either a p-n-p or an n-p-n structure with an associated mass of metal attached to one of the zones having p-type conductivity in the former or to one of the zones having n-type conductivity in the latter (n-p-n) structure. A base contact is ohmically affixed to the intermediate or n-type zone in the p-n-p structure (to the p-type zone in the n-p-n structure). If an n-p-n structure is used, a positive going synchronizing pulse should be used rather than the negative going pulses 35 as shown in FIG. 1. Also if an n-p-n structure is used the polarity of transformer winding 45 should be reversed so as to apply positive going pulses to electrode 34 rather than the negative going pulses as described hereinafter. Electrical leads are connected to the first conductivity zones in either type of structure and to the base contact, and to the mass of metal. The mass of metal connection may be conveniently designated a collector as indicated by the numeral 34. The connection to the first conductivity zone is designated as an emitter 36 and the ohmic connection 38 may, for the present purposes, be designated as a base electrode. The semiconductor device has functional characteristics as illustrated by the curves of FIG. 2.

In FIG. 2 the vertical axis indicates the potential of collector electrode 34 relative to the emitter electrode 36. The horizontal axis represents collector current flowing through the principal current path of the semiconductor device between the emitter and collector electrodes, and the family of collector characteristics curves represent conductivity characteristics for different values of control current flowing in the emitter to base electrode current path of the device 33. If a reverse potential is applied across the collector emitter electrode so as to bias the collector negative with respect to the emitter, the semiconductor device 33 has a high static and dynamic resistance so that less than 1 milliampere of current will flow even at voltages as large as about 24 volts between the emitter and collector. As the emitter collector voltage is increased, there is reached a point at which the current flowing in the emitter-collector current path is critical, and the semiconductor device will become hyperconductive so that the dynamic resistance assumes a negative value. Thus, by application of a predetermined voltage magnitude between the emitter and collector electrodes, the semiconductor device may be switched from a low conductivity mode to a high conductivity state in which as little as 2 volts at the collector will sustain a current of approximately one half ampere between the collector and emitter with the collector current magnitude being solely dependent upon the collector-emitter voltage and completely independent of the base current. The critical collector voltage required to switch the semiconductor device from the low conductivity state to the high conductivity state may be controlled by varying the base to emitter control current. For example from the curves of FIG. 2, it may be seen that approximately 32 volts at the collector is required to switch the semiconductor device when the base current is zero. On the other hand, with the base current of approximately 6 milliamperes, the semiconductor device may be switched to the high conductivity state by a collector voltage of approximately 10 volts. Thus, by applying a control current of 6 milliamperes or larger to the base to emitter current path of the semiconductor device, the device will be switched to the high conductivity mode as soon as the collector voltage reaches approximately 10 volts and will remain in the high conductivity state, even in the absence of base to emitter control current until the collector voltage falls to substantially zero.

A hyperconductive semiconductor device which may be used in the present invention is described in detail in copending U.S. patent application Serial No. 694,038, entitled "Semiconductor Transistor Switches," filed March 28, 1957, now abandoned, and assigned to the same assignee as the present invention. For a more detailed description of the construction, characteristics and operations of one semiconductor devive which may be used in the present invention, reference is made to the above-mentioned copending application.

Another similar hyperconductive negative resistance semiconductor device which has been found usable in accordance with the teachings of the present invention is described in detail in an article entitled "The Thyristor" at pages 48 to 51 of the magazine "Electronic Design" issue of March 19, 1958. One such device manufactured by the Radio Corporation of America and sold under the type designation TA1693 has been used in the circuit configuration of FIG. 1. Alternatively, the present invention may utilize a controlled semiconductor rectifier having a gating electrode which will function in the manner described above. One such control rectifier is described in detail in "Control Engineering," March 1958, at page 132. For the purposes of the present invention, the switching device 33 may comprise any controllable semiconductor device which includes a control electrode and a pair of other electrodes defining a principal current path therethrough, and which has a bistable collector current characteristic such that the minimum emitter collector voltage required to switch the device from its low conductivity state to its high conductivity state is variable as a function of the control current applied in the current path beween the emitter and base electrodes. The characteristic curves of FIG. 2 are given as an example of the characteristics of one device which is usable in the circuit of the present invention.

In accordance with the present invention, the second output circuit of sync separator 18 is connected across a biasing resistor 32 which is connected between the emitter electrode 36 and the base electrode 38 of the semiconductor device 33. A current limiting load resistor 41 has one end connected to the collector electrode 34 and has its other end connected to one end of the secondary winding 45 of pulse transformer 42. The lower end of secondary winding 45 is connected to one end of a filter capacitor 46 with the other end of the capacitor being connected to the emitter electrode 36. As shown in FIG. 1 the emitter electrode conveniently may be connected to ground or a point of reference potential.

The horizontal output stage 24 is provided with an auxiliary output circuit 43, constituting a source of negative going retrace pulses, which retrace pulses are substantially time coincident with the flyback or retrace portion of the deflection current wave applied to deflection coils 25. The retrace pulses from source 43 are applied to the primary winding 44 of pulse transformer 42, and are coupled by secondary winding 45 through capacitor 46 to the emitter and collector electrodes of semiconductor device 33. Thus transformer 42 comprises means for applying the negative going retrace pulses to the collector electrode 34 with respect to the emitter electrode 36 so that the collector electrode is driven negative in proportion to the amplitude of the retrace pulses during periodic time intervals corresponding to the flyback portion of the deflection current wave applied to deflection coils 25. Capacitor 46 constitutes means for accumulating and averaging the collector current of semiconductor device 33 and applying the same to the input terminals of low pass filter 29. Capacitor 46 develops a charge which corresponds to the average or direct current magnitude of the emitter to collector current of semiconductor device 33.

Low pass filter 29 is of conventional construction comprising a pair of input terminals 47 and 48 and a pair of output terminals 49 and 50 with a resistor 52 connected between the terminals 47 and 49, a resistor 58 and a capacitor 53 coupled in series between the terminals 49 and 50, and an additional capacitor 51 connected across the output terminals. The output terminals 49 and 50 of low pass filter 29 are connected directly to the frequency controlling input terminals of the scanning wave generator 23.

The scanning wave generator 23 is shown by way of example as comprising a cathode coupled transistor multivibrator. The structure and operation of such multivibrator circuits are well known in the art and accordingly are not described in minute detail. It will be understood that any one of various known transistor blocking oscillator or multivibrator circuits might be used within the scope of this invention. For example, one oscillator circuit suitable for use with the present invention is shown and described in detail in "Junction Transistor Electronics," by R. B. Hurley; John Wiley & Sons, at page 421 and FIG. 21.6. One characteristic of all such multivibrator and blocking oscillator circuits is that they generally have input impedances of the order of 3000 ohms or less and therefore require substantial power from the phase detector circuit 22 or other source of phase control signal. Conventional dual diode phase detector circuits will not provide the output current necessary for driving such low impedance oscillators. The circuit of this invention overcomes that difficulty by providing substantial power gain between the sync separator 18 and the scanning wave oscillator 23.

Figure 3:
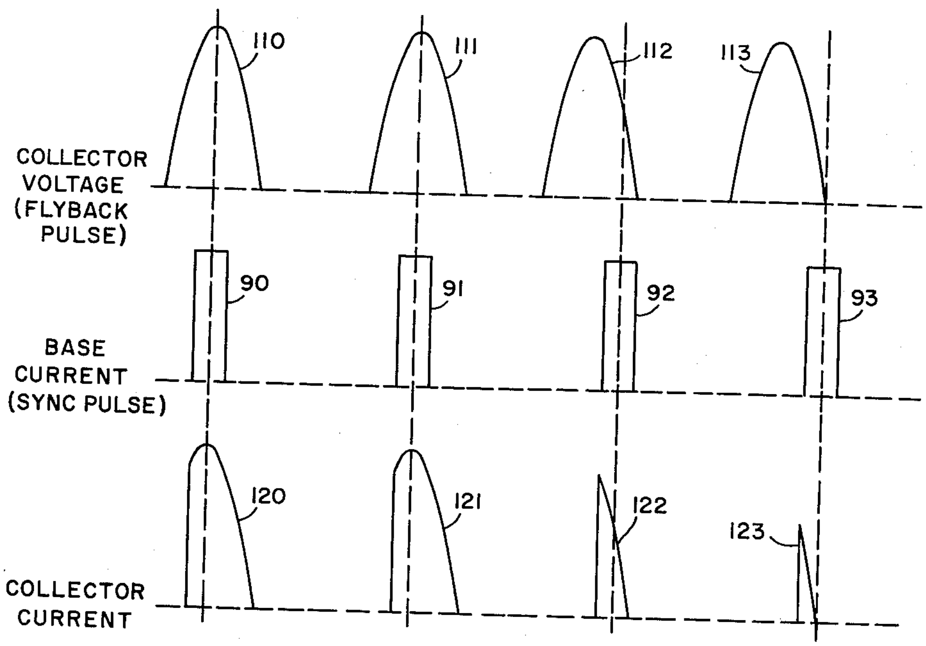
FIG. 3 illustrates the operating characteristics of a hyperconductive negative resistance semiconductor device of the type utilized in the invention; and, FIG. 4 illustrates a further embodiment of an automatic frequency control system in accordance with the present invention.

In FIG. 3 there is shown a plurality of wave forms illustrating the operation of the system of FIG. 1 under different phase relationships between the input synchronizing pulses from sync separator 18 and the retrace pulses applied to collector 34 by transformer winding 45. Pulses 90, 91, 92 and 93 indicate normal synchronizing pulses as applied to base electrode 38 from sync separator 18. Numerals 110 and 111 indicate correctly phased retrace pulses as applied to the phase detector circuit by transformer winding 45. At 112 there is indicated a retrace pulse which leads the synchronizing pulse 92 and corresponds to the condition existing when the frequency of the deflection wave form generator 23 is higher than the frequency of the incoming synchronizing signal. Numeral 113 indicates the retrace pulse provided when the generator 23 is running at an even more advanced phase condition.

The relative phase conditions indicated by curves 93 and 113 is an undesirable condition which would result in a black bar appearing at the left-hand vertical edge of the viewing screen and would result in a portion of the right edge of the display being destroyed. The pulses 120 to 123, in FIG. 3, indicate the collector current pulses flowing through semiconductor device 33 in response to the various retrace pulse phasings as indicated by pulses 110–113. Pulse 121, for example, indicates the collector current which will flow when the deflection generator 23 is correctly phase as shown by the retrace pulse 111 being substantially centered with respect to the synchronizing pulse 91. It will be appreciated that if the retrace pulse 111 were shifted slightly to the right, so that the leading edge of the sync pulse 91 would coincide with the beginning of the retrace pulse then semiconductor device 33 would be triggered near the beginning of the retrace pulse and the area of the collector current pulse 121 would be increased. Conversely if the retrace pulse is advanced in phase relative to the sync pulse as indicated by curves 112 and 92, the semiconductor device will remain non-conductive during the larger portion of the retrace pulse applied to the collector electrode, and the collector current pulse would be reduced in amplitude and time duration as shown by the curve 122. Thus, the charge stored in capacitor 46 during each retrace pulse increases as the retrace pulses are retarded in phase and decreases as the retrace pulses are advanced in phase relative to the sync pulses applied to base electrode 38. The recurrent pulses of collector current flowing from semiconductor device 33 are collected by capacitor 46 and integrated by the low pass filter 29 to provide at output terminals 49 and 50 a direct current frequency control potential corresponding to the phase relationship between the retrace pulses and the synchronizing pulse components of the received television signal.

It should be particularly noted that when semiconductor device 33 is triggered to its high conductivity state by the leading edge of a synchronizing pulse applied across the base emitter circuit, the device 33 becomes conductive and remains conductive thereafter until the retrace pulse applied to the collector drops to zero. The collector current magnitude during that interval is independent of the base current and hence is independent of the synchronizing pulse amplitude. The foregoing characteristics of the circuit of this invention is particularly advantageous in that the frequency control potential developed by circuit 22 varies solely as a function of phase relationship and is independent of the amplitude of the input synchronizing signal.

Figure 4:
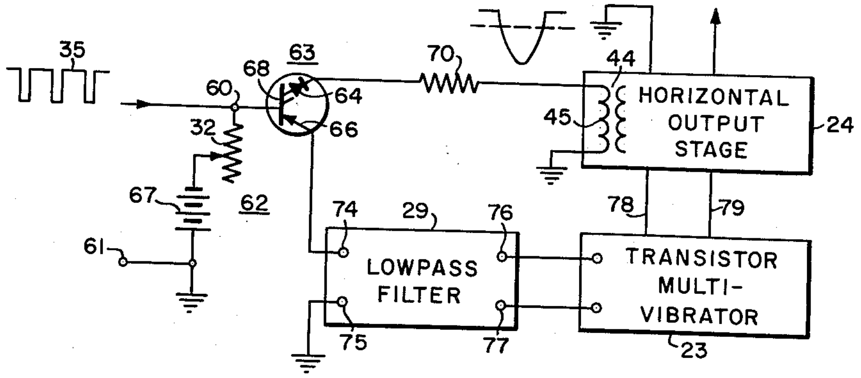

In FIG. 4 there is shown a deflection wave generator and automatic frequency control circuit for performing the same general functions as the line frequency deflection system of the apparatus of FIG. 1. The phase comparator circuit 62 of FIG. 4 is provided with an input synchronizing signal at terminals 60 and 61, which signal may be identical to that supplied from sync separator 18 in the apparatus of FIG. 1. Connected between input terminals 60 and 61, in series combination are a variable resistance 32 and a bias source 67. Input terminal 60 is connected directly to base electrode 68 of semiconductor device 63. Emitter electrode 66 is connected directly to a first input terminal 74 of low pass filter 29 and the other input terminal 75 is connected to a point of reference potential and hence to the positive terminal of bias source 67. Collector electrode 64 is connected through load resistor 70 to one terminal of an auxiliary winding 45 of the flyback transformer 44 which comprises a portion of the horizontal output stage 24. The output terminals 76 and 77 of low pass filter 29 are connected to the frequency controlling input circuit of transistor multivibrator 23. The output terminals of multivibrator 23 are coupled to the input circuit of output stage 24 by conductors 78 and 79.

In operation the circuit system of FIG. 4 is substantially similar to that heretofore described in connection with FIG. 1. FIG. 4 differs in that the polarity of the output signal as developed by low pass filter 29 is reversed by having the low pass filter connected between the emitter 66 and ground rather than in the collector circuit. The circuit of FIG. 4 differs further in that it will provide phase control on either slope of the retrace pulses applied to the collector. The bias source 67 and variable resistor 32 in the base to emitter circuit of semiconductor device 63 enable adjustment of the base bias or quiescent base current to a level such that the semiconductor device will be switched from the high conductive state to the low conductive state at the end of the applied synchronizing pulse. Thus in the presence of a retrace pulse applied to the collector electrode, the leading edge of the synchronizing pulse applied to the base electrode will turn the semiconductor device "on" and the trailing edge of the same pulse will turn the device "off" so that the semiconductor device produces a pulse of collector current having a time duration corresponding to that of the input synchronizing pulse and having a magnitude which is proportional to the amplitude of the portion of the retrace pulse which is coincident with the sync pulse. Thus the phase comparator circuit 62 will produce small pulses of output current if the synchronizing pulse coincides with a low amplitude portion of the retrace pulse, and will produce larger pulses of output current as the retrace pulse is advanced to position the maximum amplitude portion thereof in coincidence with the synchronizing pulse applied to the base electrode. Thus the average output current of the phase comparator circuit is a function of phase relationship over the leading half of the applied retrace pulse, even though the duty cycle may be constant.

It is to be understood that in accordance with conventional practice the pulse transformer 44 or 45 as shown in FIG. 1 need not be a special component provided in the phase detector circuit, but may simply comprise an auxiliary winding on the conventional flyback transformer of the horizontal output stage 24.

From the foregoing disposed embodiments, it will be apparent to persons skilled in the art that the present invention provides a phase comparator circuit for automatic frequency control which utilizes the energy supplying capabilities of the horizontal deflection retrace pulse to provide power amplification of the direct current control signal produced by the phase comparator. Further the circuit provided by the present invention enables a substantial economy of circuit components and circuit complexity as compared to conventional dual diode phase detector circuits. In addition, since the phase comparator circuit of the invention is independent of slight variations in the height of the input synchronizing pulses, the output signal is a true indication of the phase relationship between the retrace pulses and the synchronizing pulses and is entirely independent of amplitude modulation of the sync pulses such as frequently occurs in commercial television receivers.

While the present invention has been shown in certain preferred embodiments only, it will be obvious to those skilled in the art that it is not limited to the embodiments disclosed, but is susceptible of various changes and modifications without departing from the spirit and scope thereof.

We claim as our invention:

1. A system for synchronizing a periodic wave generator with a synchronizing pulse wave comprising a hyperconductive negative resistance semiconductor device having an emitter, a collector and a control electrode; means for applying said synchronizing pulse wave to said control electrode; pulse source means for providing, from the generator output, time spaced voltage pulses of predetermined magnitude, means for applying said voltage pulses to the collector of said semiconductor device with a polarity to induce current flow in the emitter-collector current path thereof during the portion of each of said voltage pulses which is time coincident with a synchronizing pulse; low pass filter means, having an output circuit connected to said periodic wave generator and having a pair of input terminals, for producing a unidirectional control current corresponding to the average direct current value of current pulses applied to said input terminals; means providing a direct current conductive series circuit including said input terminals and the emitter-collector current path of said transistor for applying current pulses from said collector to said filter means so that said filter means applies a control current to said generator which varies in accordance with the phase of the output of the generator relative to the phase of said synchronizing pulse wave and independently of synchronizing pulse amplitude variations.

2. In a television receiver the combination comprising a source of synchronizing pulses; a deflection generator including a control potential responsive variable phase oscillator and a source of retrace pulses; phase comparison means including a hyperconductive negative resistance semiconductor device having a collector electrode, an emitter and a control electrode; circuit means for applying said synchronizing pulses across the emitter-control electrode current path of said semiconductor device; means coupling said source of retrace pulses to the collector electrode of said device; a load circuit connected in series with the emitter-collector current conduction path of said device, with said load circuit including an integration network having output terminals coupled to supply a direct current control potential to said oscillator for varying the phase thereof in accordance with the phase of said retrace pulses relative to said synchronizing pulses.

3. In a television receiver horizontal deflection system a source of line frequency sync pulses; an indirectly synchronized deflection wave generator of the type which is phase controlled by a unidirectional automatic phase control potential, with said generator comprising a source of retrace pulses which occur simultaneously with the retrace portion of the deflection wave; low pass filter means, having an output circuit coupled to said deflection wave generator and having a pair of input terminals, for producing a unidirectional phase control potential corresponding to the time integral of current pulses applied to said input terminals, a phase comparator comprising a bistable semiconductor device having an emitter electrode, a control electrode and a collector electrode and exhibiting a controllable breakdown characteristic including a low conductivity state and a high conductivity negative resistance state with the magnitude of collector-emitter voltage required to switch said device from said low state to said high state being dependent upon control current amplitude flowing between said emitter and control electrodes; emitter-collector current path connected in series circuit with said retrace pulse source and the input terminals of said filter means, and means coupled to said source of sync pulses for applying the same to said control electrode so that current flows through said series circuit only during said retrace pulses and in proportion to the relative phase of said sync pulses with respect to said retrace pulses, whereby said low pass filter means integrates the current pulses in said series circuit to provide a control potential which varies as a function of the phase relation of said retrace pulses and sync pulses.

4. In a television receiver deflection system: a source of line frequency sync signals; an indirectly synchronized multivibrator comprising a pair of regeneratively coupled transistors for generating a line frequency deflection wave, said multivibrator being of the type which is frequency controlled by a direct current control signal, a deflection output stage coupled to said multivibrator and including a pair of output terminals for providing retrace pulses which occur simultaneously with the retrace portion of the deflection wave; phase comparator means comprising a bistable semiconductor device having an emitter electrode, a control electrode and a collector electrode and exhibiting a controllable breakdown characteristic including a low conductivity state and a high conductivity negative resistance state with the magnitude of collector-emitter voltage required to switch said device from said low state to said high state being dependent upon control current amplitude flowing between said emitter and control electrodes; means for applying said sync signals to said control electrode to induce a pulse waveform control current flow through the emitter-control electrode circuit of said semiconductor device; filter means having a pair of input terminals and having an output circuit coupled to the control signal input circuit of said multivibrator for producing a direct current frequency control signal corresponding to the average current applied to said input terminals; and a direct current series circuit including the output terminals of said deflection output, said input terminals of said filter means, and the emitter-collector current path of said semiconductor device connected with such polarity that said retrace pulses are in a sense tending to render said device conductive and tending to produce current flow through the emitter-collector current path substantially in proportion to the amplitudes of said retrace pulses, thereby to develop in said filter means a control signal having an amplitude determined by the phase of said retrace pulses relative to said line frequency sync signals and independent of sync signal amplitude variation.

5. In a television receiver horizontal deflection system: a source of line frequency sync pulses; an indirectly synchronized multivibrator comprising a pair of regeneratively coupled transistors for generating a line frequency deflection wave, said multivibrator being of the type which is frequency controlled by a direct current automatic frequency control signal and including a control signal input circuit having an input impedance of the order of 500 ohms; a horizontal deflection output stage coupled to said multivibrator including a flyback transformer having a pair of output terminals for providing retrace pulses which occur simultaneously with the retrace portion of the horizontal deflection wave; phase comparator means comprising a bistable semiconductor device having an emitter electrode, a control electrode and a collector electrode and exhibiting a controllable breakdown characteristic including a low conductivity state and a high conductivity negative resistance state with the magnitude of collector-emitter voltage required to switch said device from said low state to said high state being dependent upon control current amplitude flowing between said emitter and control electrodes; means for applying said line frequency sync pulses to said control electrode to trigger said semiconductor device at times corresponding to the leading edges of said sync pulses; low pass filter means having an output circuit coupled to the control signal input circuit of said multivibrator and having a pair of input terminals for producing a direct current frequency control signal corresponding to the average current applied to said input terminals; and a direct current series circuit including the output terminals of the flyback transformer, the input terminals of said low pass filter means, and the emitter-collector current path of said transistor all interconnected with such relative polarity that said retrace pulses are in a sense to render said semiconductor device conductive during the portion of each retrace pulse which is subsequent to the leading edge of a coincident sync pulse thereby to develop in said low pass filter means a control signal having an average amplitude determined by the phase of said retrace pulses relative to said line frequency sync pulses and substantially independent of the amplitude of said sync pulses.

6. A control system for holding a multivibrator in step with synchronization pulses, which multivibrator includes a frequency controlling input circuit and an output circuit in which sawtooth voltage waves having trace and retrace portions are produced comprising: circuit means coupled to the multivibrator output circuit for producing voltage pulses corresponding in time with the retrace portion of each sawtooth voltage wave; phase comparator means comprising a bistable semiconductor device having an emitter electrode, a control electrode and a collector electrode and exhibiting a controllable breakdown characteristic including a low conductivity state and a high conductivity negative resistance state with the magnitude of collector-emitter voltage required to switch said device from said low state to said high state being dependent upon control current amplitude flowing between said emitter and control electrodes; means for applying said synchronization pulses to said control electrode; means connected to said circuit means for applying said voltage pulses across the emitter-collector current path of said semiconductor device so that the same is recurrently switched to said high conductivity state at the time of occurrence of said synchronization pulses; and means coupled serially with said last-mentioned means for controlling said multivibrator so that the frequency thereof varies as a function of the average collector current of said semiconductor device and independently of variations in the peak amplitude of said synchronization pulses.

7. In a control system for holding a sawtooth wave generator in step with synchronization pulses, which generator includes a frequency controlling input circuit and an output circuit in which sawtooth waves having trace and retrace portions are produced, the combination comprising: circuit means coupled to the generator output circuit for producing retrace pulses corresponding in time with the retrace portion of each sawtooth wave produced by the generator, low pass filter means coupled to the generator input circuit for producing a direct current frequency control signal proportional to the average energy content of periodic current pulses applied to the filter means, phase comparator means comprising a bistable semiconductor device having an emitter electrode, a control electrode and a collector electrode and exhibiting a controllable breakdown characteristic including a low conductivity state and a high conductivity negative resistance state with the magnitude of collector-emitter voltage required to switch said device from said low state to said high state being dependent upon control current amplitude flowing between said emitter and control electrodes; and with the emitter and collector electrodes of said device defining a principal current path therethrough; a series circuit combination comprising said principal current path and the input terminals of said low pass filter means; means connected to apply said retrace pulses across said series circuit combination for inducing periodic current pulses through said principal current and to said filter means; and means applying said synchronization pulses to said control electrode for recurrently switching said semiconductor device to said high conductivity state so that the time duration of said periodic current pulses varies as a function of the phase relation between said retrace pulses and said synchronization pulses and independently of the amplitude of said synchronization pulses.

References Cited in the file of this patent

UNITED STATES PATENTS 2,906,818 Goodrich ------------ Sept. 29, 1959